United States Patent
Wiser (10) Patent No.: US 9,772,510 B2
(45) Date of Patent: Sep. 26, 2017

(54) APPARATUS, SYSTEM AND METHOD FOR PHOTODETECTION WITH A TRANSIMPEDANCE AMPLIFIER OF AN EYE-MOUNTABLE DEVICE

(71) Applicant: VERILY LIFE SCIENCES LLC, Mountain View, CA (US)

(72) Inventor: Robert F. Wiser, San Francisco, CA (US)

(73) Assignee: Verily Life Sciences LLC, Mountain View, CA (US)

( * ) Notice: Subject to any disclaimer, the term of this patent is extended or adjusted under 35 U.S.C. 154(b) by 0 days.

(21) Appl. No.: 14/842,703

(22) Filed: Sep. 1, 2015

(65) Prior Publication Data

US 2017/0059883 A1   Mar. 2, 2017

(51) Int. Cl.
G02C 7/04 (2006.01)
G02C 7/08 (2006.01)
G02C 11/00 (2006.01)

(52) U.S. Cl.
CPC ............. *G02C 7/04* (2013.01); *G02C 7/081* (2013.01); *G02C 7/083* (2013.01); *G02C 11/10* (2013.01)

(58) Field of Classification Search
CPC .......... G02C 7/083; G02C 7/04; G02C 11/10; G02C 7/081; G01J 2001/446;

(Continued)

(56) References Cited

U.S. PATENT DOCUMENTS 4,391,215 A  *  7/1983  Sansone .............. D05B 35/102
                                                      112/275
4,913,546 A      4/1990  Shinji et al.
(Continued)

FOREIGN PATENT DOCUMENTS

EP    2772792 A1    9/2014
EP    2846183 A2    3/2015
(Continued)

OTHER PUBLICATIONS

U.S. Appl. No. 14/737,363, filed Jun. 11, 2015, Wiser et al.
PCT/US2016/045376—International Search Report and Written Opinion, mailed Dec. 2, 2016, 13 pages.

*Primary Examiner* — Darryl J Collins
(74) *Attorney, Agent, or Firm* — Christensen O'Connor; Johnson Kindness PLLC (57) ABSTRACT

Techniques and mechanisms to perform photodetection with an eye-mountable device. In an embodiment, the eye-mountable device includes an enclosure material and light sensor circuitry formed therein, the enclosure material to be disposed in or on an eye of a user. The light sensor circuitry comprises a transimpedance amplifier circuit including a differential amplifier, one or more feedback paths coupled across the differential amplifier, a photodiode and a capacitor coupled between the photodiode and an input terminal of the differential amplifier. Incidence of light upon the photodiode results in some charging of the capacitor, where an amplified signal is provided at an output terminal of differential amplifier based on such charging. The capacitor mitigates static power consumption by the photodiode. In another embodiment, the amplified signal is evaluated based on at least two threshold values to detect a direction of gaze by the user.

23 Claims, 5 Drawing Sheets

(58) Field of Classification Search
CPC ...... G01J 2001/4466; G01J 1/46; H03G 3/20;
H03G 3/3084; G11B 11/10576; G11B
11/10595; A61B 5/02416; A61B 5/1123;
A61F 9/0017; G06F 3/013
USPC ........ 351/159, 159.02, 159.03; 359/209–210
See application file for complete search history.

(56) References Cited

U.S. PATENT DOCUMENTS

| | | | |
|---|---|---|---|
| 5,767,538 A * | 6/1998 | Mullins | H03F 3/08 |
| | | | 257/115 |
| 7,183,531 B2 | 2/2007 | Olsen et al. | |
| 7,224,858 B2 | 5/2007 | Welch et al. | |
| 8,608,310 B2 | 12/2013 | Otis et al. | |
| 8,636,358 B2 | 1/2014 | Binder | |
| 2002/0134919 A1* | 9/2002 | Washburn | G02B 6/4201 |
| | | | 250/214 A |
| 2012/0140167 A1 | 6/2012 | Blum | |
| 2012/0245444 A1 | 9/2012 | Otis et al. | |
| 2014/0107447 A1 | 4/2014 | Liu et al. | |
| 2014/0107448 A1 | 4/2014 | Liu et al. | |
| 2014/0192318 A1 | 7/2014 | Guth et al. | |
| 2014/0194773 A1 | 7/2014 | Pletcher et al. | |
| 2014/0209481 A1 | 7/2014 | Pletcher et al. | |
| 2014/0213867 A1 | 7/2014 | Pletcher et al. | |
| 2014/0240655 A1* | 8/2014 | Pugh | G02C 7/04 |
| | | | 351/158 |
| 2014/0240657 A1* | 8/2014 | Pugh | G02C 7/04 |
| | | | 351/159.03 |
| 2014/0240665 A1* | 8/2014 | Pugh | G02C 7/04 |
| | | | 351/205 |
| 2014/0243971 A1 | 8/2014 | Pugh et al. | |
| 2014/0327875 A1 | 11/2014 | Blum et al. | |
| 2015/0182116 A1* | 7/2015 | Pletcher | A61B 5/0026 |
| | | | 600/345 |

FOREIGN PATENT DOCUMENTS

| | | |
|---|---|---|
| WO | WO 2011/016860 A1 | 2/2011 |
| WO | WO 2014/043614 A1 | 3/2014 |

* cited by examiner

APPARATUS, SYSTEM AND METHOD FOR PHOTODETECTION WITH A TRANSIMPEDANCE AMPLIFIER OF AN EYE-MOUNTABLE DEVICE

BACKGROUND

1. Technical Field

This disclosure relates generally to the field of optics, and in particular but not exclusively, relates to contact lenses.

2. Background Art

Accommodation is a process by which the eye adjusts its focal distance to maintain focus on objects of varying distance. Accommodation is a reflex action, but can be consciously manipulated. Accommodation is controlled by contractions of the ciliary muscle. The ciliary muscle encircles the eye's elastic lens and applies a force on the elastic lens during muscle contractions that change the focal point of the elastic lens.

As an individual ages, the effectiveness of the ciliary muscle degrades. Presbyopia is a progressive age-related loss of accommodative or focusing strength of the eye, which results in increased blur at near distances. This loss of accommodative strength with age has been well studied and is relatively consistent and predictable. Presbyopia affects nearly 1.7 billion people worldwide today (110 million in the United States alone) and that number is expected to substantially rise as the world's population ages.

Recent technologies have begun to provide for various devices that operate in or on a human eye to aid the visual focus of a user. For some types of these devices, an accommodating lens includes one or more elements and circuitry to apply an electrical signal to change a focusing power of the one or more elements. Determining when to change such focusing power is often based on a direction of a gaze by a user of the optical device.

As successive generations of accommodation-capable (and other) eye-mountable devices continue to scale down in size and scale up in functionality, there is expected to be an increased demand for such optical devices to efficiently utilize power and other resources. Accordingly, incremental improvements such resource utilization are expected to significantly impact the usability of such eye-mountable devices.

BRIEF DESCRIPTION OF THE DRAWINGS

The various embodiments of the present invention are illustrated by way of example, and not by way of limitation, in the figures of the accompanying drawings and in which.

DETAILED DESCRIPTION

Embodiments of an apparatus, system and methods of operation for an eye-mountable device (EMD) with photodetection capability are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Certain features of various embodiments are described herein with reference to performance of photodetection at an EMD to determine a direction of gaze—e.g., wherein the direction of gaze is a basis for subsequently providing a level of accommodation with the EMD. However, such description may be extended to additionally or alternatively apply to any of a variety of other applications wherein an EMD is to perform light sensing according to different embodiments. As discussed herein, light sensing may be performed, according to an embodiment, with circuitry that is configured to mitigate power consumption by a photodiode. Such power savings may be critical in various severely power-constrained EMD use cases.

Described herein is a smart contact lens or other EMD that includes photodetection circuitry and, in some embodiments, logic for identifying the direction or focal distance of a user's gaze. Embodiments of the EMD may include a light sensor system embedded within an enclosure material—e.g., along with power supply circuitry, control electronics, an accommodation actuator, an antenna and/or the like—where the enclosure material is formed to be contact mounted to an eye. The light sensor system may include a transimpedance amplifier circuit that includes a differential amplifier, a photodiode and a capacitor coupled between the photodiode and an input terminal of the differential amplifier, where the capacitor is to mitigate power consumption by the photodiode. The capacitor may block at least some direct current that might otherwise flow through the photodiode. An output from the transimpedance amplifier circuit may be evaluated by a comparator circuit based on one or more threshold levels. In an embodiment, a threshold level is based on other light sensing that is to detect a level of ambient light in a surrounding environment.

Figure 1:
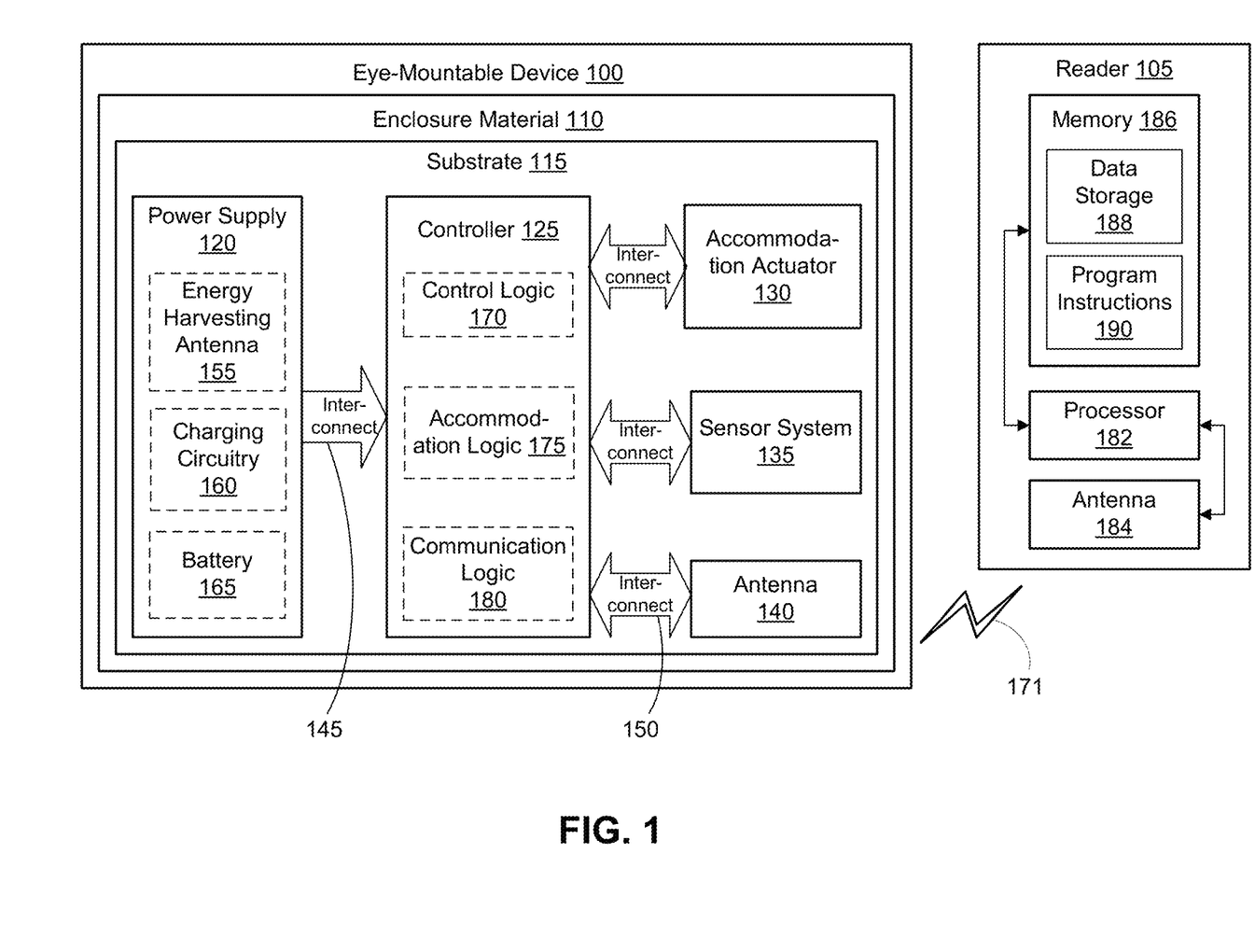
FIG. 1 is a functional block diagram of a photodetection-capable eye-mountable device along with an external reader, in accordance with an embodiment of the disclosure.

FIG. 1 illustrates one example of a photodetection-capable eye-mountable device 100 with gaze tracking for auto-accommodation along with an external reader 105, in accordance with an embodiment of the disclosure. The exposed portion of eye-mountable device 100 is an enclosure material 110 formed to be contact-mounted to a corneal surface of an eye. A substrate 115 is embedded within or surrounded by enclosure material 110 to provide a mounting surface for a power supply 120, a controller 125, an accommodation actuator 130, a sensor system 135, an antenna 140, and various interconnects 145 and 150. The illustrated embodiment of power supply 120 includes an energy harvesting antenna 155, charging circuitry 160, and a battery 165. The illustrated embodiment of controller 125 includes control logic 170, accommodation logic 175, and communication logic 180. The illustrated embodiment of reader 105 includes a processor 182, an antenna 184, and memory 186. The illustrated embodiment of memory 186 includes data storage 188 and program instructions 190.

Controller 125 is coupled to receive feedback control signals from sensor system 135 and further coupled to operate accommodation actuator 130. Power supply 120 supplies operating voltages to the controller 125 and/or the accommodation actuator 130. Antenna 140 is operated by the controller 125 to communicate information to and/or from eye-mountable device 100. In one embodiment, antenna 140, controller 125, power supply 120, and sensor system 135 are all situated on the embedded substrate 115. In one embodiment, accommodation actuator 130 is embedded within enclosure material 110, but is not disposed on substrate 115. Because eye-mountable device 100 includes electronics and is configured to be contact-mounted to an eye, it is also referred to herein as an ophthalmic electronics platform, contact lens, or smart contact lens.

To facilitate contact-mounting, the enclosure material 110 may have a concave surface configured to adhere ("mount") to a moistened corneal surface (e.g., by capillary forces with a tear film coating the corneal surface). Additionally or alternatively, the eye-mountable device 100 may be adhered by a vacuum force between the corneal surface and enclosure material 110 due to the concave curvature. While mounted with the concave surface against the eye, the outward-facing surface of the enclosure material 110 may have a convex curvature that is formed to not interfere with eye-lid motion while the eye-mountable device 100 is mounted to the eye. For example, the enclosure material 110 may be a substantially transparent curved disk shaped similarly to a contact lens.

Enclosure material 110 may include one or more biocompatible materials, such as those employed for use in contact lenses or other ophthalmic applications involving direct contact with the corneal surface. Enclosure material 110 may optionally be formed in part from such biocompatible materials or may include an outer coating with such biocompatible materials. Enclosure material 110 may include materials configured to moisturize the corneal surface, such as hydrogels and the like. In some instances, enclosure material 110 may be a deformable ("non-rigid") material to enhance wearer comfort. In some instances, enclosure material 110 may be shaped to provide a predetermined, vision-correcting optical power, such as can be provided by a contact lens. Enclosure material may be fabricated of various materials including a polymeric material, a hydrogel, PMMA, silicone based polymers (e.g., fluoro-silicon acrylate), or otherwise.

Substrate 115 includes one or more surfaces suitable for mounting the sensor system 135, controller 125, power supply 120, and antenna 140. Substrate 115 may be employed both as a mounting platform for chip-based circuitry (e.g., by flip-chip mounting) and/or as a platform for patterning conductive materials (e.g., gold, platinum, palladium, titanium, copper, aluminum, silver, metals, other conductive materials, combinations of these, etc.) to create electrodes, interconnects, antennae, etc. In some embodiments, substantially transparent conductive materials (e.g., indium tin oxide) may be patterned on substrate 115 to form circuitry, electrodes, etc. For example, antenna 140 may be formed by depositing a pattern of gold or another conductive material on substrate 115. Similarly, interconnects 145 and 150 may be formed by depositing suitable patterns of conductive materials on substrate 115. A combination of resists, masks, and deposition techniques may be employed to pattern materials on substrate 115. Substrate 115 may be a relatively rigid material, such as polyethylene terephthalate ("PET") or another material sufficient to structurally support the circuitry and/or electronics within enclosure material 110. Eye-mountable device 100 may alternatively be arranged with a group of unconnected substrates rather than a single substrate. For example, controller 125 and power supply 120 may be mounted to one substrate, while antenna 140 and sensor system 135 are mounted to another substrate and the two may be electrically connected via interconnects.

In some embodiments, power supply 120 and controller 125 (and the substrate 115) may be positioned away from the center of eye-mountable device 100 and thereby avoid interference with light transmission to the eye through the center of eye-mountable device 110. In contrast, accommodation actuator 130 may be centrally positioned to apply optical accommodation to the light transmitted to the eye through the center of eye-mountable device 110. For example, where eye-mountable device 100 is shaped as a concave-curved disk, substrate 115 may be embedded around the periphery (e.g., near the outer circumference) of the disk. In some embodiments, sensor system 135 includes one or more discrete photodetector sensors that are distributed, for example, to sense the eyelid overlap. Sensor system 135 and/or substrate 115 may be substantially transparent to incoming visible light to mitigate interference with light transmission to the eye.

Substrate 115 may be shaped as a flattened ring with a radial width dimension sufficient to provide a mounting platform for the embedded electronics components. Substrate 115 may have a thickness sufficiently small to allow the substrate to be embedded in enclosure material 110 without adversely influencing the profile of eye-mountable device 100. Substrate 115 may have a thickness sufficiently large to provide structural stability suitable for supporting the electronics mounted thereon. For example, substrate 115 may be shaped as a ring with a diameter of about 10 millimeters, a radial width of about 1 millimeter (e.g., an outer radius 1 millimeter larger than an inner radius), and a thickness of about 50 micrometers. Substrate 115 may optionally be aligned with the curvature of the eye-mounting surface of eye-mountable device 100 (e.g., convex surface). For example, substrate 115 may be shaped along the surface of an imaginary cone between two circular segments that define an inner radius and an outer radius. In such an example, the surface of substrate 115 along the surface of the imaginary cone defines an inclined surface that is approximately aligned with the curvature of the eye mounting surface at that radius.

In the illustrated embodiment, power supply 120 includes a battery 165 to power the various embedded electronics, including controller 125. Battery 165 may be inductively charged by charging circuitry 160 and energy harvesting antenna 155. In one embodiment, antenna 140 and energy harvesting antenna 155 are independent antennae, which serve their respective functions of energy harvesting and communications. In another embodiment, energy harvesting antenna 155 and antenna 140 are the same physical antenna that provide respective functions for time-shared inductive charging and wireless communications with reader 105. Additionally or alternatively, power supply 120 may include a solar cell ("photovoltaic cell") to capture energy from incoming ultraviolet, visible, and/or infrared radiation. Furthermore, an inertial power scavenging system may be included to capture energy from ambient vibrations.

Charging circuitry 160 may include a rectifier/regulator to condition the captured energy for charging battery 165 or directly power controller 125 without battery 165. Charging circuitry 160 may also include one or more energy storage devices to mitigate high frequency variations in energy harvesting antenna 155. For example, one or more energy storage devices (e.g., a capacitor, an inductor, etc.) may be connected to function as a low-pass filter.

Controller 125 contains logic to choreograph the operation of the other embedded components. Control logic 170 controls the general operation of eye-mountable device 100, including providing a logical user interface, power control functionality, etc. Accommodation logic 175 includes logic for monitoring feedback signals from sensor system 135, determining the current gaze direction or focal distance of the user, and manipulating accommodation actuator 130 in response to provide the appropriate accommodation. The auto-accommodation may be implemented in real-time based upon feedback from the gaze tracking, or permit user control to select specific accommodation regimes (e.g., near-field accommodation for reading, far-field accommodation for regular activities, etc.). Communication logic 180 provides communication protocols for wireless communication with reader 105 via antenna 140. In one embodiment, communication logic 180 provides backscatter communication via antenna 140 when in the presence of an electromagnetic field 171 output from reader 105. In one embodiment, communication logic 180 operates as a smart wireless radio-frequency identification ("RFID") tag that modulates the impedance of antenna 140 for backscatter wireless communications. The various logic modules of controller 125 may be implemented in software/firmware executed on a general purpose microprocessor, in hardware (e.g., application specific integrated circuit), or a combination of both.

Eye-mountable device 100 may include various other embedded electronics and logic modules. For example, a light source or pixel array may be included to provide visible feedback to the user. An accelerometer or gyroscope may be included to provide positional, rotational, directional or acceleration feedback information to controller 125.

It is noted that the block diagram shown in FIG. 1 is described in connection with functional modules for convenience in description, but does not necessarily connote physical organization. Rather, embodiments of eye-mountable device 100 may be arranged with one or more of the functional modules ("sub-systems") implemented in a single chip, multiple chips, in one or more integrated circuits, or otherwise.

External reader 105 includes an antenna 184 (or group of more than one antennae) to send and receive wireless signals 171 to and from eye-mountable device 100. External reader 105 also includes a computing system with a processor 182 in communication with a memory 186. Memory 186 is a non-transitory computer-readable medium that may include, without limitation, magnetic disks, optical disks, organic memory, and/or any other volatile (e.g. RAM) or nonvolatile (e.g. ROM) storage system readable by the processor 182. Memory 186 may include a data storage 188 to store indications of data, such as data logs (e.g., user logs), program settings (e.g., to adjust behavior of eye-mountable device 100 and/or external reader 105), etc. Memory 186 may also include program instructions 190 for execution by processor 182 to cause the external reader 105 to perform processes specified by the instructions 190. For example, program instructions 190 may cause external reader 105 to provide a user interface that allows for retrieving information communicated from eye-mountable device 100 or allows transmitting information to eye-mountable device 100 to program or otherwise select operational modes of eye-mountable device 100. External reader 105 may also include one or more hardware components for operating antenna 184 to send and receive wireless signals 171 to and from eye-mountable device 100.

External reader 105 may be a smart phone, digital assistant, or other portable computing device with wireless connectivity sufficient to provide the wireless communication link 171. External reader 105 may also be implemented as an antenna module that can be plugged in to a portable computing device, such as in an example where the communication link 171 operates at carrier frequencies not commonly employed in portable computing devices. In some instances, external reader 105 is a special-purpose device configured to be worn relatively near a wearer's eye to allow the wireless communication link 171 to operate with a low power budget. For example, the external reader 105 may be integrated in a piece of jewelry such as a necklace, earring, etc. or integrated in an article of clothing worn near the head, such as a hat, headband, etc.

Figure 2A:
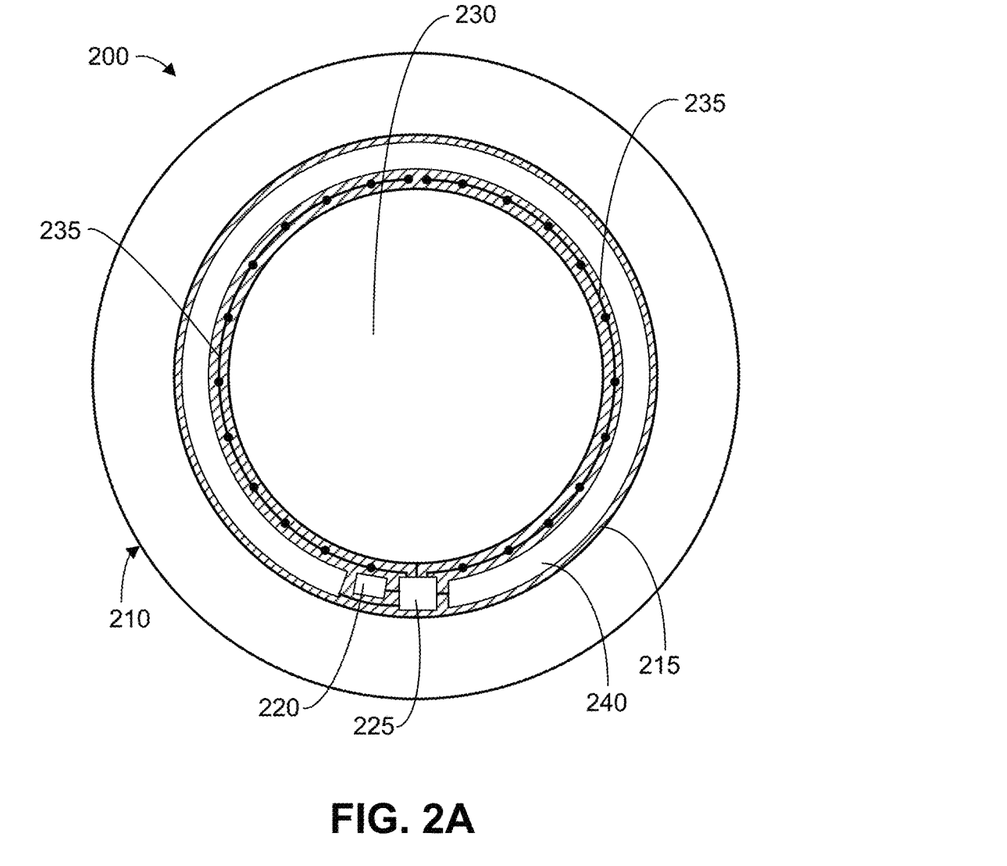
FIG. 2A is a top view of an eye-mountable device, in accordance with an embodiment of the disclosure.
Figure 2B:
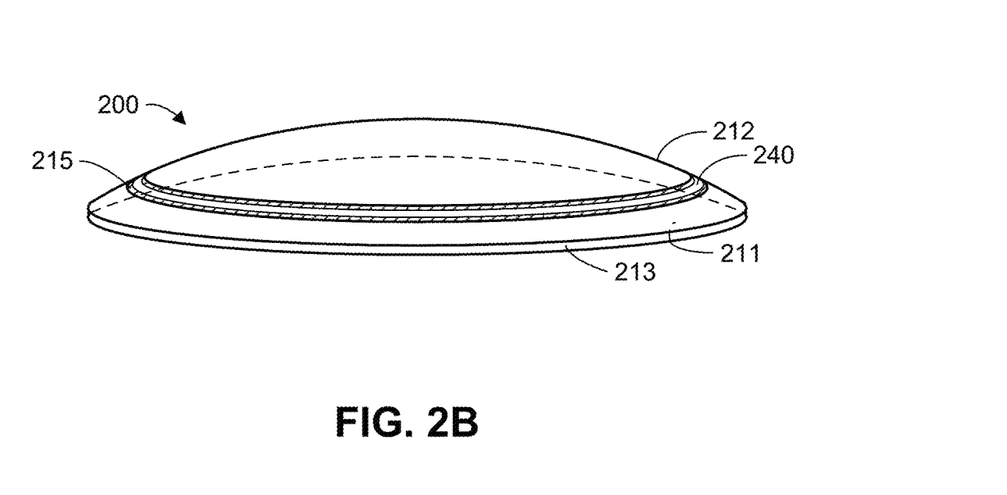
FIG. 2B is a perspective view of an eye-mountable device, in accordance with an embodiment of the disclosure.

FIGS. 2A and 2B illustrate two views of an eye-mountable device 200, in accordance with an embodiment of the disclosure. FIG. 2A is a top view of eye-mountable device 200 while FIG. 2B is a perspective view of the same. Eye-mountable device 200 is one possible implementation of eye-mountable device 100 illustrated in FIG. 1. The illustrated embodiment of eye-mountable device 200 includes an enclosure material 210, a substrate 215, a power supply 220, a controller 225, an accommodation actuator 230, a sensor system 235, and an antenna 240. It should be appreciated that FIGS. 2A and 2B are not necessarily drawn to scale, but have been illustrated for purposes of explanation only in describing the arrangement of the example eye-mountable device 200.

Enclosure material 210 of eye-mountable device 200 is shaped as a curved disk. Enclosure material 210 is a substantially transparent material to allow incident light to be transmitted to the eye while eye-mountable device 200 is mounted to the eye. Enclosure material 210 is a biocompatible material similar to those employed to form vision correction and/or cosmetic contact lenses in optometry, such as a polymeric material, polyethylene terephthalate ("PET"), polymethyl methacrylate ("PMMA"), polyhydroxyethylmethacrylate ("polyHEMA"), a hydrogel, silicon based polymers (e.g., fluoro-silicon acrylate) combinations of these, or otherwise. Enclosure material 210 may be formed with one side having a concave surface 211 suitable to fit over a corneal surface of an eye. The opposite side of the disk may have a convex surface 212 that does not interfere with eyelid motion while eye-mountable device 200 is mounted to the eye. In the illustrated embodiment, a circular or oval outer side edge 213 connects the concave surface 211 and convex surface 212.

Eye-mountable device 200 may have dimensions similar to a vision correction and/or cosmetic contact lenses, such as a diameter of approximately 1 centimeter, and a thickness of about 0.1 to about 0.5 millimeters. However, the diameter and thickness values are provided for explanatory purposes only. In some embodiments, the dimensions of eye-mountable device 200 may be selected according to the size and/or shape of the corneal surface of the wearer's eye. Enclosure material 210 may be formed with a curved shape in a variety of ways. For example, techniques similar to those employed to form vision-correction contact lenses, such as heat molding, injection molding, spin casting, etc. can be employed to form enclosure material 210.

Substrate 215 is embedded within enclosure material 210. Substrate 215 may be embedded to be situated along the outer periphery of enclosure material 210, away from the central region where accommodation actuator 230 is positioned. In the illustrated embodiment, substrate 215 encircles accommodation actuator 230. Substrate 215 does not interfere with vision because it is too close to the eye to be in focus and is positioned away from the central region where incident light is transmitted to the light-sensing portions of the eye. In some embodiments, substrate 215 may optionally be formed of a transparent material to further mitigate effects on visual perception. Substrate 215 may be shaped as a flat, circular ring (e.g., a disk with a centered hole). The flat surface of substrate 215 (e.g., along the radial width) is a platform for mounting electronics and for patterning conductive materials to form electrodes, antenna(e), and/or interconnections.

Figure 3A:
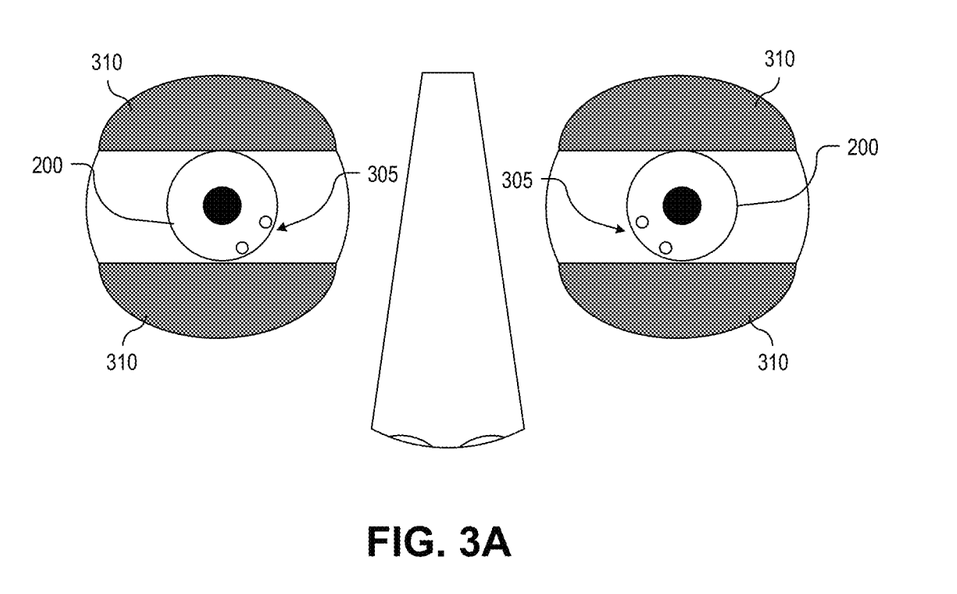
FIGS. 3A and 3B illustrate the general operation of a gaze detection mechanism, in accordance with an embodiment of the disclosure.
Figure 3B:
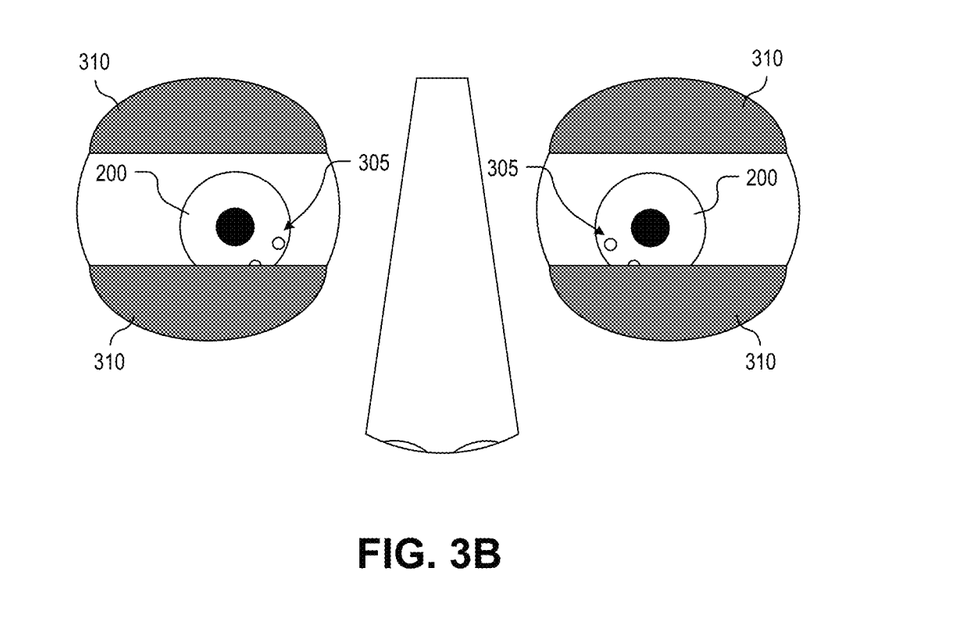

Sensor system 235 is distributed at least partially about eye-mountable device 200 to sense eyelid overlap based on photodetection. By monitoring the amount and position of eyelid overlap, feedback signals from the one or more light sensors of sensor system 235 may be measured by controller 225 to determine the approximate gaze direction and/or focal distance. Referring to FIG. 3A, eye-mountable device 200 is disposed on a cornea that is looking straight forward. In this position, at least two light sensors 305 are not overlapped by eyelids 310, which influences their exposure to light. Controller 225 may determine that the cornea is looking straight forward via the feedback signals from sensors 305. In this scenario, controller 224 may determine that the user is focusing on the far-field and the accommodation adjusted accordingly. Correspondingly (see FIG. 3B), if controller 225 determines, based upon the amount and locations of eyelid 310 overlap of one of sensors 305, that the cornea is looking down and/or inward towards the nose, then it can be assumed the user is focusing on the near-field (e.g., reading). In this scenario, the amount of accommodation applied by accommodation actuator 230 should correspond to a near-field focal distance associated with the activity of reading.

Sensor system 235 is disposed within enclosure material 210 on substrate 215. In the illustrated embodiment, sensor system 235 is distributed peripherally around accommodation actuator 230. In the illustrated embodiment, sensor system 235 is disposed along the inner edge of substrate 215 between antenna 240 and accommodation actuator 230. In other embodiments, sensor system 235 may be partially or entirely distributed along the outer edge of substrate 215 peripherally to antenna 240. Sensor system 235 may be disposed on the backside of substrate 215 adjacent to concave surface 211 or on the frontside of substrate 215 adjacent to convex surface 212. Several orientations, groupings, and distributions may be used to implement sensor system 235. In the illustrated embodiment, sensor system 235 includes a plurality of discrete photodetector sensors distributed at a same distance from a center of enclosure material 210; however, various implementations include photodetectors at different respective distances from such a center. Some implementations for a gaze tracking mechanism, such as one including sensor system 235, are discussed in further detail below in connection with FIGS. 6A, 6B.

Accommodation actuator 230 is centrally positioned within enclosure material 210 to affect the optical power of eye-mountable device 200 in the user's center of vision. In various embodiments, accommodation actuator 230 operates by changing is index of refraction under the influence of controller 225. By changing its refractive index, the net optical power of the curved surfaces of eye-mountable device 200 is altered, thereby applying controllable accommodation. Accommodation actuator 230 may be implemented using a variety of different electro-active optical devices. For example, accommodation actuator 230 may be implemented using a layer of liquid crystal (e.g., a liquid crystal cell) disposed in the center of enclosure material 210. In other embodiments, accommodation actuator 230 may be implemented using other types of electro-active optical materials such as electro-optic materials that vary refractive index in the presence of an applied electric field. Accommodation actuator 230 may be a distinct device embedded within enclosure material 210 (e.g., liquid crystal cell), or a bulk material having a controllable refractive index. In yet another embodiment, accommodation actuator 230 may be implemented using a deformable lens structure that changes shape under the influence of an electrical signal. Accordingly, the optical power of eye-mountable device 200 is controlled by controller 225 with the application of electric signals via one or more electrodes extending from controller 225 to accommodation actuator 230.

Accommodation actuator 230 may be implemented using a variety of different liquid crystal structures including nematic liquid crystal, nematic twisted liquid crystal, cholesteric liquid crystal, or blue phase liquid crystal. Since a low switching voltage is desirable for low power chip design, nematic liquid crystals with switching voltages less than 5 V are suitable. With the application of a 5V control signal, refractive index switching ranging from approximately 1.74 in an off-mode to 1.52 in an on-mode is achievable. A refractive index shift of 0.2 should be sufficient to provide near-field accommodation for reading.

Returning to FIG. 2A, loop antenna 240 is a layer of conductive material patterned along the flat surface of the substrate to form a flat conductive ring. In some examples, to allow additional flexibility along the curvature of the enclosure material, loop antenna 240 may include multiple substantially concentric sections electrically joined together. Each section may then flex independently along the concave/convex curvature of eye-mountable device 200. In some examples, loop antenna 240 may be formed without making a complete loop. For instances, antenna 240 may have a cutout to allow room for controller 225 and power supply 220, as illustrated in FIG. 2A. However, loop antenna 240 may also be arranged as a continuous strip of conductive material that wraps entirely around the flat surface of substrate 215 one or more times. For example, a strip of conductive material with multiple windings may be patterned on the backside of substrate 215 opposite controller 225, power supply 220, and sensor system 235. Interconnects between the ends of such a wound antenna (e.g., the antenna leads) may then be passed through substrate 215 to controller 225.

Since eye-mountable device 100 may be used by different user's having a variety of different eye sizes and eyelid shapes, a configuration process may be useful to train the system for a particular user. Accordingly, a gaze detection calibration may be executed upon an initial use (or even on a periodic basis) to acquire baseline readings for different gaze directions and focal distances.

Figure 4:
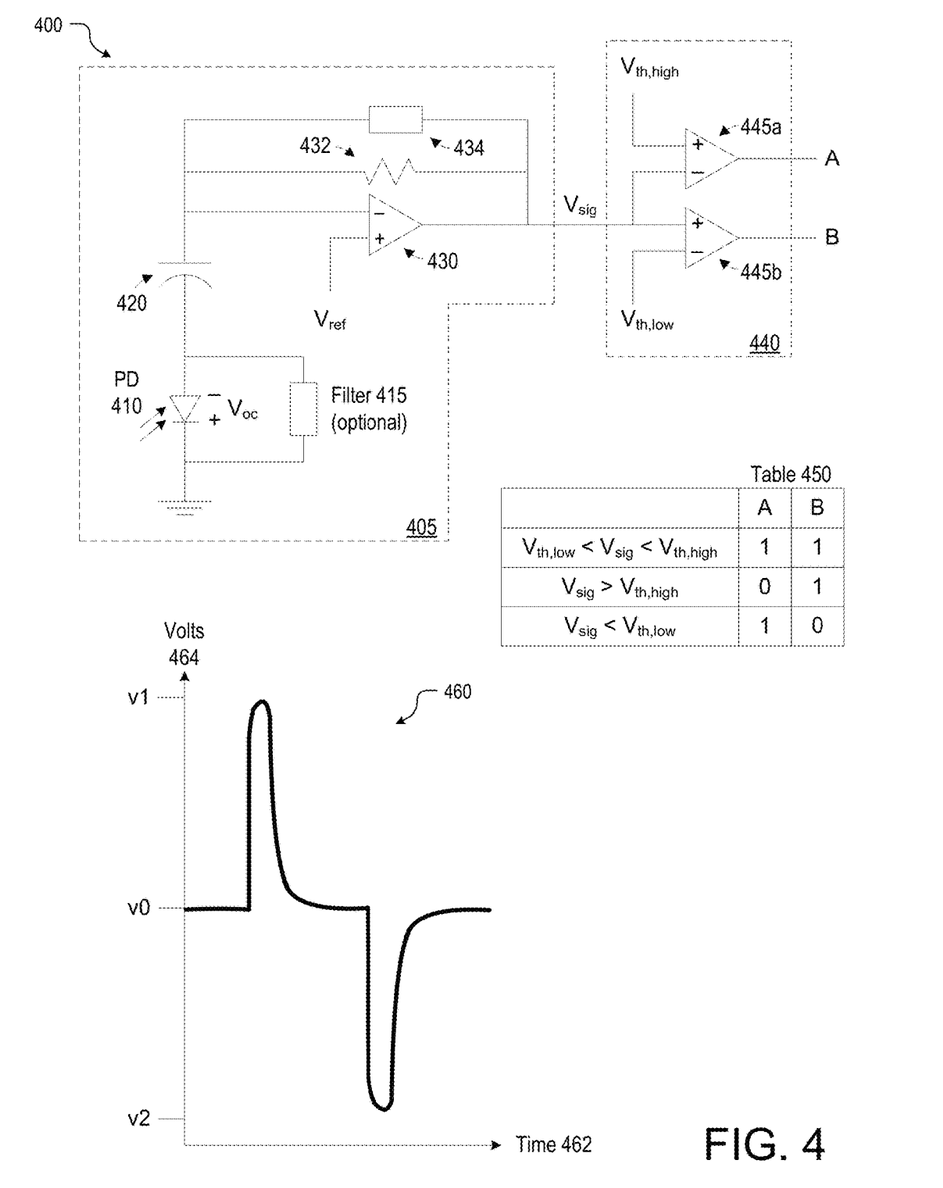
FIG. 4 is a circuit diagram illustrating elements of light sensor circuitry of an eye-mountable device according to an embodiment.

FIG. 4 illustrates elements of circuitry 400 of an eye-mountable device to perform light sensing according to an embodiment. Circuitry 400 may include features of one of sensor systems 135, 235—e.g., where circuitry 400 is disposed in an enclosure material of an EMD. In the example embodiment shown, circuitry 400 includes a transimpedance amplifier circuit 405 comprising a photodiode PD 410 and a differential amplifier 430 configured to generate an amplified signal $V_{sig}$ based on light that is incident upon photodiode PD 410.

Transimpedance amplifier circuit 405 may include one or more feedback paths that are coupled across (e.g., between an output terminal of and some input terminal of) differential amplifier 430, the one or more feedback paths each including a respective load. In one embodiment, the one or more feedback paths are each coupled between an output terminal of differential amplifier 430 and an inverting input terminal of differential amplifier 430. By way of illustration and not limitation, a first feedback path including a resistor 432 may be coupled between an output terminal of differential amplifier 430 and the inverting input terminal of differential amplifier 430. Alternatively or in addition, another feedback path including a capacitive load 434 may be coupled between the output terminal and the inverting input terminal of differential amplifier 430. The feedback load across differential amplifier 430 may determine at least in part an amplification to generate $V_{sig}$.

In an embodiment, a capacitor 420 of transimpedance amplifier circuit 405 is coupled between PD 410 and differential amplifier 430—e.g., where a circuit path including capacitor 420 and PD 410 is coupled to the same input terminal of differential amplifier 430 to which the one or more feedback paths are coupled. Capacitor 420 may block at least some direct current that might otherwise flow through PD 410. As a result, capacitor 420 may mitigate power consumption by PD 410 which would otherwise result from such direct current. Such power mitigation may be very important in severely power-constrained EMD applications.

The output terminal of differential amplifier 430 may provide $V_{sig}$ based on a voltage at capacitor 420 that, in turn, is based on light incident upon the photodiode. For example, a reference voltage $V_{ref}$ (e.g., a ground potential, a bias voltage or the like) may be provided at another terminal of differential amplifier 430 (e.g., at the non-inverting input terminal), where $V_{sig}$ represents an amplified version of a difference between $V_{ref}$ and a voltage at capacitor 420.

In an illustrative embodiment, a voltage $V_{oc}$ across PD 410 may vary with a level of light that is incident upon PD 410. During typical operation, PD 410 may self-bias to a level of $V_{oc}$ that, for example, results in zero current. Graph 460 illustrates one example of the voltage 464 of an amplified signal, such as $V_{sig}$, during operation of circuitry 400 (or other such light sensor circuitry of an EMD) over time 462. During operation of circuitry 400, an abrupt change in an amount of light incident on PD 410 may cause a transient current spike to be generated with PD 410. The direction of a spike in voltage 464 may depend on if the amount of light incident upon PD 410 abruptly increases or decreases. The magnitude of such a spike may depend, for example, on a magnitude of the light level change and a gain provided by the configuration of transimpedance amplifier circuit 405. The spike may cause transient current to pass through capacitor 420 and, in some embodiments, through a feedback load—e.g., through resistor 432—coupled across differential amplifier 430. This may cause some local peak at $V_{sig}$ (e.g., v1 in graph 460), which then decays as capacitor 420 prevents DC current flow into differential amplifier 430. The decay may result in $V_{sig}$ eventually settling back to $V_{ref}$ or some other baseline voltage (e.g., v0 in graph 460).

In one embodiment, a maximum value of $V_{oc}$ is between 0.1 and 0.4 V and capacitor 420 provides a capacitance between 90 nanoFarads (nF) and 110 nF. Alternatively or in addition, resistor 432 may provide a resistance between 10 Ohms ($\Omega$) and 100 MegaOhms (M$\Omega$), load 434 may provide a capacitance between 90 nF and 110 nF and $V_{ref}$ may be in a range between 0.4 V and 0.6V (e.g., where $V_{ref}$ is equal to one-half of a supply voltage for differential amplifier 430). However, such values are merely illustrative, and may vary significantly according to implementation-specific details.

Transimpedance amplifier circuit 405 is one example of a transimpedance amplifier circuit, according to an embodiment, that includes a differential amplifier, a photodiode and a capacitor coupled between the photodiode and an input terminal of the differential amplifier, where the capacitor is to mitigate static power consumption by the photodiode. Other such transimpedance amplifiers may be provided according to different embodiments, e.g., where such transimpedance amplifiers variously include additional and/or alternative feedback paths across a differential amplifier, different photodiode biasing, different connection of a photodiode to another input terminal and/or the like. Although certain embodiments are not limited in this regard, transimpedance amplifier circuit 405 may further include an optional filter 415 coupled across PD 410. Filter 415 may include circuitry to filter out some frequency component (or range of frequency components) of $V_{oc}$. In an embodiment, filter 415 includes a resistor that, in conjunction with capacitor 420, sets a high pass corner frequency. Filtering components that are at or below 60 Hertz (Hz), for example, may mitigate interference that might otherwise result from some artificial lighting sources (e.g., fluorescent lighting) in a surrounding environment.

Circuitry 400 may further comprise comparison logic 440 to perform a comparison based on an amplified signal and at least one threshold level. By way of illustration and not limitation, comparison logic 440 may receive $V_{sig}$, a first reference signal $V_{th,high}$ representing a first threshold level and a second reference signal $V_{th,low}$ representing a second threshold level. The comparison logic 440 may output one or more signals representing a relationship between $V_{sig}$ and one or both of $V_{th,high}$ and reference signal $V_{th,low}$. In the example embodiment shown, comparison logic 440 includes differential amplifiers 445a, 445b each coupled to receive $V_{sig}$ and a respective one of $V_{th,high}$ and $V_{th,low}$—e.g., where $V_{th,high}$ represents a threshold voltage level that is higher than one represented by $V_{th,low}$. An output A generated differential amplifier 445a may indicate whether a current level of $V_{sig}$ is less than $V_{th,high}$. Alternatively or in addition, an output B generated differential amplifier 445b may indicate whether the current level of $V_{sig}$ is greater than $V_{th,low}$. One example of the information represented by outputs A, B is illustrated in table 450.

By evaluating $V_{sig}$ based on two different reference signals, comparison logic 440 mitigates the possibility that an output from circuitry 400 might repeatedly transition between logical states in a short period of time. Such rapid transitions might otherwise occur, for example, if $V_{sig}$ were evaluated based on only a single threshold voltage level and $V_{sig}$ was, at some point, near that threshold voltage level. In an embodiment, one or more voltage thresholds such as $V_{th,high}$ and $V_{th,low}$ may be dynamically adjusted—e.g., based on a secondary light sensor (not shown) monitoring the level of ambient light in a surrounding environment. Such a secondary light sensor may be positioned closer to the middle of the eye so would not change based on the direction the user is looking. A responsiveness of the second light sensor to changes in light levels may be different to a corresponding light responsiveness provided with PD 410. For example, a light response profile of circuitry 400 may be relatively linear, as compared to a more non-linear (e.g., logarithmic) light response profile provided with the secondary light sensor.

Figure 5A:
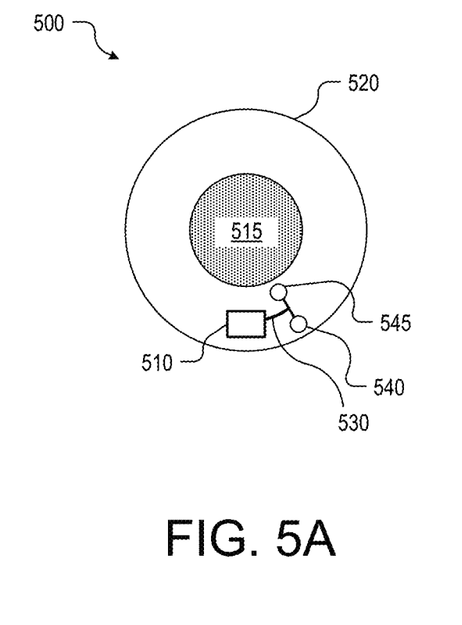
FIGS. 5A and 5B illustrate different photodetector layouts on an eye-mountable device for a gaze tracking system, each in accordance with a corresponding embodiment of the disclosure.
Figure 5B:
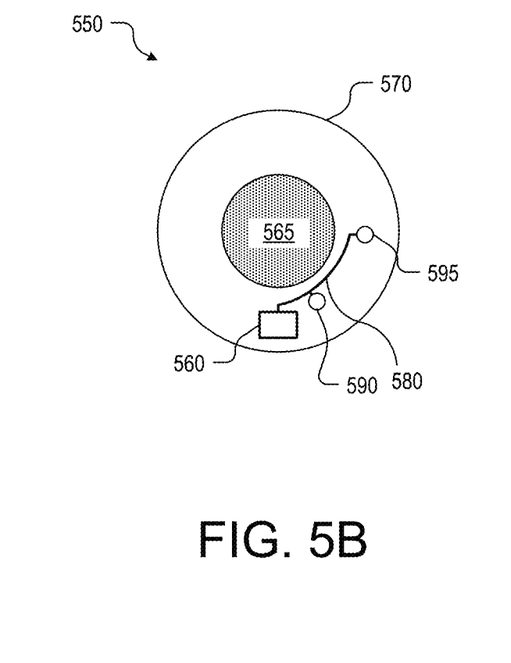

FIGS. 5A, 5B illustrate different sensor layouts for implementing a sensor system of an eye-mountable device, in accordance with various embodiments. These sensor systems represent, for example, possible implementations of sensor systems 135, 235. FIG. 5A illustrates a sensor system 500 disposed within an eye-mountable device 520 that, for example, includes features of one of EMDs 100, 200. Operation of EMD 520 may aid in sensor system 500 determining an optical strength (such as a focal length) to be provided with an accommodation actuator 515 of EMD 520.

In an embodiment, sensor system 500 includes a controller 510 (e.g., comprising logic of controller 125) and at least two photodiodes coupled thereto. By way of illustration and not limitation, controller 510 may be variously coupled via one or more traces 530 to photodiodes 540, 545. The one or more traces 530 may enable respective operation of PDs 540, 545 by providing some or all of a reference potential (e.g., ground), a supply voltage, one or more threshold voltages and/or the like. One or more traces 530 may further provide for one or more signals to be communicated to controller 510. Light sensor circuitry, such as that of circuitry 400, may be variously located at PDs 540, 545, at controller 510 and/or at another location of sensor system 500.

In an embodiment, photodetection by PD 545 may result in a first detector circuit of sensor system 500 configuring one or more threshold voltage levels for another detector circuit that includes PD 540. Such detector circuitry may be variously located at PDs 540, 545 or, in another embodiment, in controller 510. One of PDs 540, 545 may be configured to provide a light response profile that is more linear than a corresponding light response profile for which the other of PDs 540, 545 is configured.

A location of PD 545 in EMD 520 may provide for PD 545 to be more exposed, over time, to ambient light of a surrounding environment (e.g., as compared to the amount of such exposure over time for EMD 540). In the illustrative embodiment shown, PD 545 is closer than PD 540 to a center of EMD 520, whereby PD 540 is—as compared to PD 545—more likely be covered at different times by an eyelid of a user. When the cornea of the user moves, an eyelid overlap of PD 540 may cause a signal to be generated by detector circuitry that includes PD 540. Such detector circuitry may be configured based on a concurrent or earlier light detection by PD 545. Different signal levels, frequencies, values or other characteristics of such a signal may be associated with different gazing directions and/or focal distances and may thereby be used—e.g., by controller 510—to determine a user's gazing direction and/or focal distance.

FIG. 5B illustrates another sensor system 550 disposed within an eye-mountable device 570 that, for example, includes features of one of EMDs 100, 200. Operation of EMD 570 may aid in sensor system 550 determining an optical strength to be provided with accommodation actuator 565. Sensor system 550 may include features similar to those of sensor system 500. For example, sensor system 550 may include a controller 560, one or more traces 580 and PDs 590, 595 that correspond functionally to, controller 510, one or more traces 530 and PDs 540, 545, respectively.

In an embodiment, photodetection by PD 595 may result in a first detector circuit of sensor system 500 configuring one or more threshold levels to be provided to another detector circuit that includes PD 590. Such detector circuitry may be variously located at PDs 590, 595 or, in another embodiment, in controller 560. One of PDs 590, 595 may be configured to provide a light response profile that is more linear than a corresponding light response profile for which the other of PDs 590, 595 is configured.

A location of PD 595 in EMD 570 may provide for PD 595 to be more exposed, over time, to ambient light of a surrounding environment (e.g., as compared to the amount of such exposure over time for EMD 590). In the illustrative embodiment shown, PDs 590, 595 are rotationally offset from one another—e.g., by at least forty-five (45) degrees—with respect to a center of EMD 570. In such an embodiment, EMD 570 may include a weighted structure, toric structure or other such mechanisms to provide for automatic orientation and/or rotational stability on an eye of the user. Such mechanisms may increase the likelihood that EMD 590 is, over time, closer than EMD 595 to an eyelid of a user. When the cornea of the user moves, an eyelid overlap of PD 590 may cause a signal to be generated by detector circuitry that includes PD 590. Such detector circuitry may be configured to generate the signal based on a concurrent or earlier light detection by PD 595. Different characteristics of such a signal may be associated with different gazing directions and/or focal distances and may thereby be used—e.g., by controller 510—to determine a user's gazing direction and/or focal distance.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible machine-readable storage medium includes any mechanism that provides (i.e., stores) information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An eye-mountable device (EMD) comprising:
an enclosure material configured to mount in front of an eye of a user; and
a first transimpedance amplifier circuit disposed in the enclosure material, the first transimpedance amplifier circuit including:
a differential amplifier including a first input terminal, a second input terminal and an output terminal;
one or more feedback paths coupled across the differential amplifier, the one or more feedback paths each including a respective load;
a photodiode; and
a first capacitor coupled in series between the photodiode and the first input terminal of the differential amplifier to block a direct current between the photodiode and the differential amplifier while passing a transient signal between the photodiode and the first input terminal,
wherein the output terminal is coupled to provide an amplified signal based on a voltage at the first capacitor, and wherein the voltage is based on the transient signal due to changes in light incident upon the photodiode.

2. The EMD of claim 1, further comprising comparison logic to perform a comparison based on the amplified signal and a first threshold level.

3. The EMD of claim 2, wherein the comparison logic receives the amplified signal, a first reference signal representing the first threshold level and a second reference signal representing a second threshold level, the comparison logic to output one or more signals representing a relationship between the amplified signal, the first threshold level, and the second threshold level.

4. The EMD of claim 1, wherein the one or more feedback paths are each coupled between the output terminal and the first input terminal, and wherein the second input terminal is to receive a reference voltage.

5. The EMD of claim 1, wherein the first transimpedance amplifier circuit further includes filter circuitry coupled across the photodiode.

6. The EMD of claim 5, wherein the filter circuitry is configured to filter a 60 Hertz component of a signal generated at the photodiode.

7. The EMD of claim 1, wherein the one or more feedback paths includes:
a first feedback path including a first resistor; and
a second feedback path including a second capacitor.

8. The EMD of claim 1, wherein the photodiode of the first transimpedance amplifier is a first photodiode and is disposed at a first location of the eye-mountable device, wherein the eye-mountable device further includes a second transimpedance amplifier circuit including a second photodiode disposed in the enclosure material at a second location, the second transimpedance amplifier to generate a second amplified signal based on the light incident upon the second photodiode, and wherein the amplified signal of the first transimpedance amplifier corresponds to a first amplified signal.

9. The EMD of claim 8, further comprising control logic including circuitry configured to determine a direction of gaze by the user based on the first amplified signal and the second amplified signal generated by the first transimpedance amplifier and the second transimpedance amplifier.

10. The EMD of claim 9, wherein the first location is radially offset from the second location with respect to a center of the eye-mountable device.

11. The EMD of claim 9, wherein a distance of the first location from a center of the eye-mountable device is greater than a distance of the second location from the center of the eye-mountable device.

12. The EMD of claim 8, wherein a light responsiveness profile of the first transimpedance amplifier circuit is linear and wherein the light responsiveness profile of the second transimpedance amplifier circuit is non-linear.

13. The EMD of claim 1, wherein the first capacitor is a coupling capacitor to receive a transient current from the photodiode and to pass the transient current through the first capacitor, and wherein the amplified signal is based at least in part on a local peak in voltage caused by the transient current.

14. An eye-mountable device (EMD) comprising:
an enclosure material configured to mount in front of an eye of a user;
an accommodation actuator disposed within the enclosure material; and
a first transimpedance amplifier circuit disposed in the enclosure material, the first transimpedance amplifier circuit including:
a differential amplifier including a first input terminal, a second input terminal and an output terminal;
one or more feedback paths coupled across the differential amplifier, the one or more feedback paths each including a respective load;
a photodiode; and
a first capacitor coupled in series between the photodiode and the first input terminal of the differential amplifier to block direct current between the photodiode and the differential amplifier and to mitigate static power consumption by the photodiode while passing a transient signal between the photodiode and the first input terminal,
wherein the output terminal is coupled to provide an amplified signal based on a voltage at the first capacitor, and wherein the voltage is based on the transient signal due to changes in light incident upon the photodiode;
comparison logic to perform a comparison based on the amplified signal, a first threshold level and a second threshold level; and
control logic to signal the accommodation actuator to provide a level of accommodation based on the comparison.

15. The EMD of claim 14, wherein the one or more feedback paths are each coupled between the output terminal and the first input terminal, wherein the second input terminal is to receive a reference voltage.

16. The EMD of claim 14, the first transimpedance amplifier circuit further includes filter circuitry coupled across the photodiode.

17. The EMD of claim 16, wherein the filter circuitry is configured to filter a 60 Hertz component of a signal generated at the photodiode.

18. The EMD of claim 14, the one or more feedback paths includes:
a first feedback path including a first resistor; and
a second feedback path including a second capacitor.

19. The EMD of claim 14, wherein the photodiode of the first transimpedance amplifier is a first photodiode and is disposed at a first location of the eye-mountable device, wherein the eye-mountable device further includes a second transimpedance amplifier circuit including a second photodiode disposed in the enclosure material at a second location, the second transimpedance amplifier to generate a second amplified signal based on the light incident upon the second photodiode, and wherein the amplified signal of the first transimpedance amplifier corresponds to a first amplified signal.

20. The EMD of claim 19, wherein the control logic is to determine a direction of gaze by the user based on the first amplified signal and the second amplified signal generated by the first transimpedance amplifier and the second transimpedance amplifier.

21. The EMD of claim 20, wherein the first location is radially offset from the second location with respect to a center of the eye-mountable device.

22. The EMD of claim 20, wherein a distance of the first location from a center of the eye-mountable device is greater than a distance of the second location from the center of the eye-mountable device.

23. An eye-mountable device (EMD) comprising:
an enclosure material configured to mount in front of an eye of a user; and
a first transimpedance amplifier circuit disposed in the enclosure material, the first transimpedance amplifier circuit including:
  a differential amplifier including a first input terminal, a second input terminal and an output terminal;
  one or more feedback paths coupled across the differential amplifier, the one or more feedback paths each including a respective load;
  a photodiode; and
  a first capacitor coupled between the photodiode and the first input terminal of the differential amplifier to block a direct current between the photodiode and the differential amplifier,
wherein the output terminal is coupled to provide an amplified signal based on a voltage at the first capacitor, and wherein the voltage is based on light incident upon the photodiode,
wherein the first capacitor is a coupling capacitor to receive a transient current from the photodiode and to pass the transient current through the first capacitor, and wherein the amplified signal is based at least in part on a local peak in voltage caused by the transient current.

* * * * *